(No Model.)

G. C. WATRISS & L. HEYNEMANN.
OPERATING MECHANISM FOR TURN TABLES ON CABLE STREET RAILWAYS.

No. 418,096. Patented Dec. 24, 1889.

Witnesses:
R. M. Clement.
J. C. White.

Inventors:
George C. Watriss
Lionel Heynemann.

UNITED STATES PATENT OFFICE.

GEORGE C. WATRISS AND LIONEL HEYNEMANN, OF SAN FRANCISCO, CALIFORNIA.

OPERATING MECHANISM FOR TURN-TABLES ON CABLE STREET-RAILWAYS.

SPECIFICATION forming part of Letters Patent No. 418,096, dated December 24, 1889.

Application filed September 4, 1889. Serial No. 322,931. (No model.)

*To all whom it may concern:*

Be it known that we, GEORGE C. WATRISS and LIONEL HEYNEMANN, both of the city and county of San Francisco, State of California, have invented a certain Improvement in the Operating Mechanism of Turn-Tables for Cable Street-Railways, of which the following is a specification.

Our invention relates to the means employed for turning the turn-tables. The methods in use at present depend, as a rule, on friction over a few points of contact, either at a special sheave arranged in contact with the traveling cable from which the power is derived for turning the table, or depend on frictional contrivances at the table itself, or on chains and ropes at the periphery of the table. These methods are objectionable owing to the difficulty of obtaining sufficient frictional contact to prevent the wear of the cable and the table. Where a chain is employed, the tension on the chain creates friction on the supports of the table, easily binding it, and the wear of the links causes a change of pitch in the chain, involving frequent adjustment.

The object of our invention is to provide a more positive method of operating turn-tables than heretofore in use, by doing away with the special sheaves depending for their efficiency on friction over a few points of contact, and by discarding ropes and chains. This object we accomplish by gearing the sheave employed to change the direction of the cable, and commonly known as the "angle" or "tail" sheave, directly to the turn-table, without the use of chains or ropes, and securing prompt starting and positive action by the means illustrated in the accompanying drawings, in which two applications of the same principle are shown.

Figure 1:
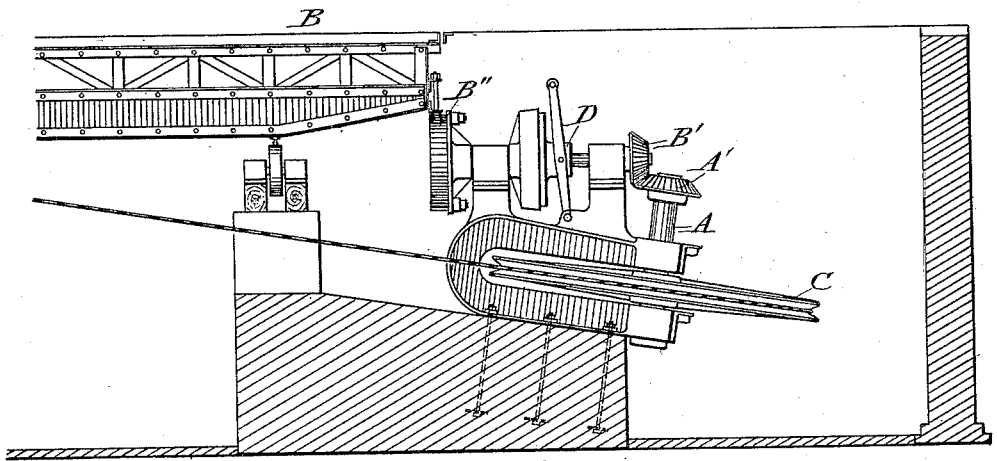

Figure 1 shows one side of a turn-table, the spindle A of the tail-sheave C carrying a toothed wheel A', from which the power is derived for turning the table B by suitable intermediate gearing B' B''. This intermediate gearing is preferably fitted to the frame of the tail-sheave itself, so that it may be fitted up altogether in the shop and placed in position as a whole, engaging in corresponding teeth, sprockets, pins, or cogs fitted to the turn-table. A clutch D serves to set the machinery in operation.

Figure 2:
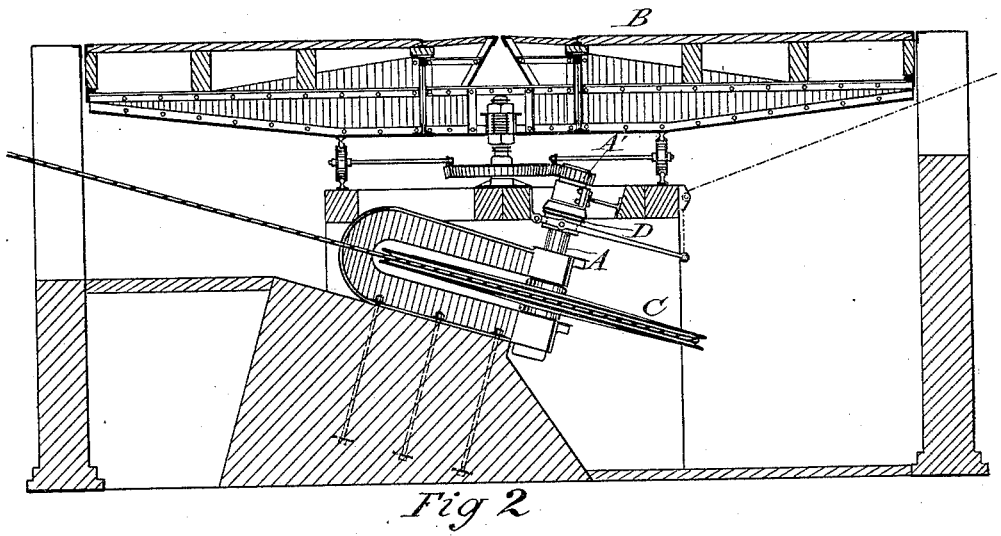

Fig. 2 shows the whole section of a turn-table, and the toothed wheel on the spindle of the tail-sheave is directly engaged with the turn-table without any intermediate gearing.

It is not essential that the arrangement should conform to either of the two plans shown. It may be varied by gearing to the turn-table from the periphery of the tail-sheave, instead of from a wheel on its axis, or by running the tail-sheave and turn-table around the same center line and gearing them together.

The essential part of our invention is in all cases the positive gearing together of tail or angle sheave with the turn-table by toothed wheels.

We do not claim, broadly, the driving of a turn-table from the tail-sheave; but

What we do claim, and desire to secure by Letters Patent, is as follows—

In a cable railway, the combination of a turn-table and tail or angle sheave geared together by toothed wheels, for the purpose described.

GEORGE C. WATRISS.
LIONEL HEYNEMANN.

Witnesses:
R. M. CLEMENT,
JOHN C. WHITE.